United States Patent
Bittner et al.

(10) Patent No.: US 8,584,751 B2
(45) Date of Patent: *Nov. 19, 2013

(54) PROCESS FOR MINERAL OIL PRODUCTION USING SURFACTANT MIXTURES

(75) Inventors: Christian Bittner, Bensheim (DE); Günter Oetter, Frankenthal (DE); Jack Tinsley, Mannheim (DE); Christian Spindler, Ludwigshafen (DE); Gabriela Alvarez Jürgenson, Mannheim (DE); Sophie Vogel, Mannheim (DE)

(73) Assignee: BASF SE (DE)

( * ) Notice: Subject to any disclaimer, the term of this patent is extended or adjusted under 35 U.S.C. 154(b) by 414 days.

This patent is subject to a terminal disclaimer.

(21) Appl. No.: 12/903,762

(22) Filed: Oct. 13, 2010

(65) Prior Publication Data

US 2011/0083848 A1    Apr. 14, 2011

Related U.S. Application Data

(60) Provisional application No. 61/251,310, filed on Oct. 14, 2009.

(51) Int. Cl.
  *E21B 43/22* (2006.01)
  *C09K 8/584* (2006.01)

(52) U.S. Cl.
  USPC ........ 166/270.1; 166/275; 166/400; 507/254; 507/255; 507/259; 507/261; 507/262; 507/936

(58) Field of Classification Search
  None
  See application file for complete search history.

(56) References Cited

U.S. PATENT DOCUMENTS

| | | | |
|---|---|---|---|
| 3,811,504 A | | 5/1974 | Flournoy et al. |
| 3,811,505 A | | 5/1974 | Flournoy et al. |
| 4,008,768 A | * | 2/1977 | Birk ........................ 166/270.1 |
| 4,016,932 A | * | 4/1977 | Kalfoglou ................... 166/270 |
| 4,059,154 A | * | 11/1977 | Braden et al. ............. 166/270.1 |
| 4,077,471 A | | 3/1978 | Shupe et al. |
| 4,371,444 A | * | 2/1983 | McCoy et al. .............. 507/225 |
| 4,446,079 A | * | 5/1984 | Hoskin ........................ 562/110 |
| 5,741,947 A | | 4/1998 | Wolf et al. |
| 2006/0185845 A1 | | 8/2006 | Shpakoff et al. |
| 2006/0189486 A1 | | 8/2006 | Shpakoff et al. |
| 2009/0270281 A1 | * | 10/2009 | Steinbrenner et al. ........ 507/237 |
| 2010/0069139 A1 | * | 3/2010 | Yoshizawa .................... 463/20 |

FOREIGN PATENT DOCUMENTS

| | | |
|---|---|---|
| DE | 4325237 A1 | 2/1995 |
| DE | 10243361 A1 | 4/2004 |
| WO | WO-2006/131541 | 12/2006 |
| WO | WO-2009/124922 | 10/2009 |

* cited by examiner

*Primary Examiner* — George Suchfield
(74) *Attorney, Agent, or Firm* — Novak Druce Connolly Bove + Quigg LLP

(57) ABSTRACT

A process for mineral oil production especially Winsor type III microemulsion flooding, in which an aqueous surfactant formulation which comprises at least one nonionic surfactant having 11 to 40 ethoxy units and a hydrophobic radical having 8 to 32 carbon atoms and at least one further surfactant differing therefrom is forced through injection wells into a mineral oil deposit and crude oil is removed from the deposit through production wells.

15 Claims, No Drawings

PROCESS FOR MINERAL OIL PRODUCTION USING SURFACTANT MIXTURES

CROSS REFERENCE TO RELATED APPLICATIONS

This application is a non-provisional of U.S. Provisional Application No. 61/251,310, filed Oct. 14, 2009, the entire disclosure of which is hereby incorporated by reference.

The invention relates to a process for mineral oil production in which an aqueous surfactant formulation which comprises at least one nonionic surfactant having 11 to 40 ethoxy units and a hydrophobic radical having 8 to 32 carbon atoms and at least one further surfactant differing therefrom is forced through injection wells into a mineral oil deposit and crude oil is removed from the deposit through production wells. The process may in particular constitute Winsor type III microemulsion flooding.

In natural mineral oil, deposits, mineral oil is present in the cavities of porous reservoir rocks which are closed off from the earth's surface by impervious covering strata. The cavities may be very fine cavities, capillaries, pores or the like. Fine pore necks may have, for example, a diameter of only about 1 µm. In addition to mineral oil, including proportions of natural gas, a deposit contains water having a higher or lower salt content.

In mineral oil production, a distinction is made between primary, secondary and tertiary production.

In primary production, after drilling into the deposit, the mineral oil flows by itself under the autogenous pressure of the deposit through the well to the surface.

After primary production, the secondary production is therefore used. In secondary production, in addition to the wells which serve the production of the mineral oil, the so-called production wells, further wells are drilled into the mineral oil-carrying formation. Water is forced through these so-called injection wells into the deposit in order to maintain the pressure or to increase it again. By forcing in water, the mineral oil is slowly forced through the cavities in the formation, starting from the injection well, in the direction of the production well. However, this functions only as long as the cavities are completely filled with oil and the more viscous oil is pushed ahead by the water. As soon as the low-viscosity water breaks through cavities, it flows from this time onward along the path of least resistance, i.e. through the resulting channel, and no longer pushes the oil in front of it.

As a rule, only about 30 to 35% of the amount of mineral oil present in the deposit can be extracted by means of primary and secondary production.

It is known that the mineral oil yield can be further increased by tertiary oil production measures. An overview of tertiary oil production is to be found, for example, in Journal of Petroleum Science and Engineering 19 (1998) 265-280. Tertiary oil production includes thermal processes in which hot water or superheated steam is forced into the deposit. As a result of this, the viscosity of the oil is reduced. Gases, such as $CO_2$ and nitrogen, can also be used as a flooding medium.

Tertiary oil production furthermore includes processes in which suitable chemicals are used as assistants for oil production. The situation toward the end of the water flood can be influenced by these and mineral oil held in the rock formation up to that time can also be extracted thereby.

For example, the interfacial tension a between the mineral oil and the aqueous phase can be reduced by the addition of suitable surfactants. This technique is also known as "surfactant flooding". In particular, surfactants which can reduce a to values of $<10^{-2}$ mN/m (ultralow interfacial tension) are suitable for this purpose. In this way, the oil droplets are able to change their shape and can be forced through the capillary openings by the flood water.

The oil droplets can then combine to form a continuous oil layer. This has advantages in two respects: firstly, when the continuous oil layer advances through new porous rock, the oil droplets present there can coalesce with the layer. Furthermore, the oil-water interface is substantially reduced by the combination of the oil droplets to form an oil layer, and surfactant no longer required is therefore released. The surfactant released can then mobilize oil droplets remaining in the formation.

The requirements regarding surfactants for tertiary mineral oil productions differ substantially from requirements regarding surfactants for other applications: suitable surfactants for tertiary mineral oil production should reduce the interfacial tension between water and oil (usually about 20 mN/m) to particularly low values of less than $10^{-2}$ mN/m in order to permit sufficient mobilization of the mineral oil. This must take place at the usual deposit temperatures of about 30° C. to about 130° C. and in the presence of water having a high salt content, in particular also in the presence of high proportions of calcium and/or magnesium ions; the surfactants must therefore also be soluble in reservoir water having a high salt content.

Mixtures of surfactants, in particular mixtures of anionic and nonionic surfactants, have already frequently been proposed for meeting these requirements.

U.S. Pat. No. 3,811,505 discloses a mixture of an anionic and a nonionic surfactant for use in deposits whose reservoir water comprises from 0.5 to 0.9% by weight of polyvalent ions. The anionic surfactants are alkanesulfonates or alkylphosphates having in each case from 5 to 25 carbon atoms or alkylarylsulfonates or alkylarylphosphates whose alkyl radical has in each case 5 to 25 carbon atoms. The nonionic surfactants are polyethoxylated alkylphenols which have from 6 to 20 ethoxy groups and whose alkyl radical has 5 to 20 carbon atoms or polyethoxylated aliphatic alcohols having 6 to 20 carbon atoms and from 6 to 20 ethoxy groups.

U.S. Pat. No. 3,811,504 discloses a mixture of 2 different anionic surfactants and a nonionic surfactant for use in deposits whose reservoir water comprises from 0.15 to 1.2% of calcium and magnesium ions. The first anionic surfactant comprises alkanesulfonates or alkylarylsulfonates, and the second comprises alkylpolyethoxysulfates. The nonionic surfactants may be polyethoxylated alkylphenols which have from 6 to 20 ethoxy groups and whose alkyl radical has 5 to 20 carbon atoms or polyethoxylated aliphatic alcohols having 6 to 20 carbon atoms and from 6 to 20 ethoxy groups.

U.S. Pat. No. 4,077,471 discloses a surfactant mixture for use in a formation whose reservoir water has a salt content of from 7 to 22%. The mixture comprises a water-soluble alkylpolyalkoxyalkanesulfonate or alkylarylpolyalkoxyalkanesulfonate and a water-insoluble nonionic surfactant obtained from an ethoxylated aliphatic alcohol or an ethoxylated, alkyl-substituted aromatic alcohol, the hydrocarbon groups having in each case 8 to 24 carbon atoms and the number of ethoxy groups being from 1 to 20.

US 2006/0185845 A1 discloses the use of a mixture of at least one aliphatic anionic surfactant and a branched aliphatic nonionic surfactant for mineral oil production. The branched aliphatic radical preferably has 10 to 24 carbon atoms and the degree of branching is from 0.7 to 2.5.

US 2006/0189486 discloses the use of a mixture of at least one branched aliphatic anionic surfactant and an aliphatic nonionic surfactant for mineral oil production. The branched aliphatic radical preferably has from 10 to 24 carbon atoms and the degree of branching is from 0.7 to 2.5.

Our prior application WO 2009/124922 discloses surfactants of the general formula iso-$C_{17}H_{35}$—X, in which X is a polar group and iso-$C_{17}H_{35}$ is an alkyl radical having a degree of branching of from 2.8 to 3.7. The document also discloses mixtures of nonionic surfactants of the general formula iso- $C_{17}H_{35}$—O—$(CH_2CH(CH_3)O)_n(CH_2CH_2O)_m$—H with anionic surfactants, n being from 0 to 15, m being from 1 to 20, preferably from 5 to 14, and the sum n+m being from 1 to 35, preferably from 2 to 20.

In a preferred embodiment of the surfactant flooding, the surfactants should form a microemulsion of Winsor type III with the water phase and the oil phase. The microemulsion (Winsor type III) is not an emulsion comprising particularly small droplets but a thermodynamically-stable, liquid mixture of water, oil and surfactants which has a very low interfacial tension and as a rule a very low viscosity. Its three advantages are that

- it achieves a very low interfacial tension a between mineral oil and aqueous phase,
- it generally has a very low viscosity and so does not become trapped in a porous matrix,
- it is produced even with very small energy inputs and is able to remain stable for an infinitely long time (whereas conventional emulsions require relatively high shearing forces, which predominantly do not arise in the reservoir, and are stabilized only kinetically).

The Winsor III microemulsion is in equilibrium with excess water and excess oil. Under these conditions of microemulsion formation, the surfactants coat the oil/water interface and lower the interfacial tension σ.

Since Winsor III microemulsions are particularly low in viscosity as compared with other types of emulsion, they are able in the flooding operation to go through the porous reservoir rock. Conventional emulsions, in contrast, may remain stuck in the porous matrix, blocking it. The Winsor type III microemulsion flooding, accordingly, is an extremely efficient process, and, unlike an emulsion flooding process, requires significantly less surfactant. With microemulsion flooding, the surfactants are typically injected alternatively together with cosolvents and/or with basic salts (optionally in the presence of chelating agents). Subsequently, a solution of thickening polymer is injected for mobility control. A further variant is the injection of a mixture of thickening polymer and also surfactants, cosolvents and/or basic salts (optionally with chelating agent) and, subsequently, a solution of thickening polymer for mobility control. These solutions ought generally to be clear, in order to avoid blockages of the reservoir.

The requirements imposed on surfactants for tertiary mineral oil production differ markedly from requirements imposed on surfactants for other applications: Suitable surfactants for tertiary oil production are intended to reduce the interfacial tension between water and oil (usually about 20 mN/m) to particularly low values of less than $10^{-2}$ mN/m, in order to allow sufficient mobilization of the mineral oil. This reduction must be accomplished at the usual reservoir temperatures of around 15° C. to 130° C. and in the presence of water with a high salt content, not least in the presence of high proportions of calcium ions and/or magnesium ions; the surfactants, therefore, must be soluble even in reservoir water with a high salt content.

In order to obtain an optimum result, the proportion of the microemulsion in the water-microemulsion-oil system at a defined amount of surfactant should of course be as great as possible. The parameters used, such as, for example, type, concentration and the mixing ratio of the surfactants used relative to one another, are therefore adapted by a person skilled in the art to the conditions (temperature, salt content) prevailing in a given mineral oil formation.

The problem occurs here that the concentration of the surfactants during the surfactant flooding in the mineral oil formation itself is virtually impossible to keep constant. Firstly, the surfactant flood forced into the injection well mixes with the formation water in the mineral oil formation, it not being absolutely necessary for the proportion of the formation water relative to the oil to be the same in all regions of the formation. Furthermore, during the above-described coalescing of the oil droplets to form an oil layer, surfactants are released again locally so that the surfactant concentration increases at this location of the formation.

For surfactant-flooding, it is therefore important for the optimum conditions for the formation of the microemulsion of the Winsor III type to have as little dependency as possible on the total concentration of the surfactant mixture used.

It was therefore an object of the invention to provide a surfactant mixture for use for surfactant flooding, in which the optimum conditions for formation of the microemulsion of the Winsor III type have as little dependency as possible on the total concentration of the surfactant mixture used.

Accordingly, a process for tertiary mineral oil production is found in which an aqueous surfactant formulation comprising at least one nonionic surfactant and at least one further surfactant is forced through at least one injection well into a mineral oil deposit and crude oil is removed from the deposit through at least one production well, the surfactant formulation at least comprising

- (A) at least one surfactant (A) of the general formula $R^1$—O—$(CH_2$—$CH_2$—$O)_x$—H, in which $R^1$ is a straight-chain or branched aliphatic and/or aromatic hydrocarbon radical having 8 to 32 carbon atoms and x is a number from 11 to 40, and
- (B) at least one surfactant (B) differing therefrom and of the general formula $R^2$—Y, in which $R^2$ is a straight-chain or branched aliphatic and/or aromatic hydrocarbon radical having 8 to 32 carbon atoms and Y is a hydrophilic group.
- the weight ratio (A)/(B) being from 10:1 to 1:20, and the proportion of the surfactants (A) and (B) together being at least 50% by weight, based on the amount of all surfactants in the surfactant mixture used.

Furthermore, a surfactant mixture for mineral oil production which comprises the two surfactants (A) and (B) was found.

The following may be stated specifically regarding the invention:

In the process according to the invention for mineral oil production, an aqueous formulation which comprises at least one surfactant (A) and at least one surfactant (B) differing therefrom is used. It may moreover comprise further surfactants and/or other components.

Surfactants (A)

The surfactants (A) have the general formula $R^1$—O—$(CH_2$—$CH_2$—$O)_x$—H (I). One or more different surfactants (A) of the formula (I) can be used.

The radical $R^1$ is a straight-chain or branched, aliphatic and/or aromatic hydrocarbon radical having 8 to 32 carbon atoms, preferably 9 to 22, particularly preferably 9 to 18 and very particularly preferably 10 to 17 carbon atoms.

It is preferably a straight-chain or branched aliphatic hydrocarbon radical, in particular a straight-chain or branched aliphatic hydrocarbon radical having 9 to 18 carbon atoms.

A branched aliphatic hydrocarbon radical has as a rule a degree of branching of from 0.1 to 4.5, preferably from 1 to 3.5. The term "degree of branching" is defined here in a manner known in principle as the number of methyl groups in a molecule of the alcohol minus 1. The average degree of branching is the statistical mean value of the degrees of branching of all molecules of a sample.

In the above formula (I), x is a number from 11 to 40, preferably from 11 to 30 and very particularly preferably from 12 to 20.

For the person skilled in the art in the area of polyalkoxylates, it is clear that the numbers x are mean values of all molecules of a sample because, in the alkoxylation of alcohols with ethylene oxide, a certain distribution of chain lengths is obtained. The distribution can be described in a manner known in principle by the so-called polydispersity D. $D=M_w/M_n$ is the quotient of the weight average of the molar mass and the number average of the molar mass. The polydispersity can be determined by means of methods known to persons skilled in the art, for example by means of gel chromatography.

Preferably, the polydispersity of the surfactants (A) used according to the invention is from 1.04 to 1.2, preferably from 1.04 to 1.15.

In a preferred embodiment of the invention, $R^1$ is a linear, aliphatic hydrocarbon radical, in particular a linear, aliphatic hydrocarbon radical having 9 to 18 carbon atoms, x being a number from 11 to 40, preferably from 11 to 30 and particularly preferably from 12 to 20.

In a further preferred embodiment of the invention, $R^1$ is a branched, aliphatic hydrocarbon radical, x being a number from 12 to 40, preferably from 12 to 30 and particularly preferably from 12 to 20.

The surfactants (A) can be prepared in a manner known in principle by the ethoxylation of corresponding alcohols $R^1$—OH. The procedure for alkoxylations is known in principle to the person skilled in the art. It is also known to the person skilled in the art that the molecular weight distribution of the alkoxylates can be influenced by the reaction conditions, in particular the choice of the catalyst.

The surfactants (A) can preferably be prepared by base-catalyzed alkoxylation. For this purpose, the alcohol $R^1$—OH can be admixed in a pressurized reactor with alkali metal hydroxides, preferably potassium hydroxide, or with alkali metal alkoxides such as, for example, sodium methylate. By means of reduced pressure (for example <100 mbar) and/or by increasing the temperature (30 to 150° C.), water still present in the mixture can be removed. The alcohol is then present as the corresponding alkoxide. Thereafter, inert conditions are established with inert gas (e.g. nitrogen) and the alkylene oxide or oxides is/are added stepwise at temperatures of from 60 to 180° C. up to a pressure of not more than 10 bar. At the end of the reaction, the catalyst can be neutralized by addition of acid (e.g. acetic acid or phosphoric acid) and can, if required, be filtered off. By means of this method, surfactants having the preferred polydispersity of from 1.04 to 1.2 can readily be obtained.

The alkoxylation of the alcohols can, however, also be carried out by means of other methods, for example by acid-catalyzed alkoxylation. Furthermore, for example, double hydroxide clays, as described in DE 43 25 237 A1, can be employed or double metal cyanide catalysts (DMC catalysts) can be used. Suitable DMC catalysts are disclosed, for example, in DE 102 43 361 A1, in particular paragraphs [0029] to [0041] and in the literature cited therein. For example, catalysts of the Zn—Co type can be used. For carrying out the reaction, the catalyst can be added to the alcohol $R^1$—OH and the mixture can be dewatered as described above and reacted with the alkylene oxides as described. Usually, not more than 1000 ppm of catalyst, based on the mixture, are used and, owing to this small amount, the catalyst can remain in the product. The amount of catalyst may as a rule be less than 1000 ppm, for example 250 ppm or less.

Surfactants (B)

In addition to the at least one surfactant (A), the formulation used comprises at least one surfactant (B) differing therefrom and of the general formula $R^2$—Y (II). Of course, a mixture of a plurality of different surfactants (B) can also be used.

$R^2$ is a straight-chain or branched, aliphatic and/or aromatic hydrocarbon radical having 8 to 32 carbon atoms, preferably 9 to 28 and particularly preferably from 10 to 24 carbon atoms.

In the formula (II), Y is a hydrophilic group. The said group may in principle be any hydrophilic groups, provided the group is sufficiently polar in order to impart amphiphilic properties, i.e. surfactant properties, to the compound. Said surfactants may be nonionic surfactants or anionic, cationic or betaine surfactants.

Preferably, the group Y is a group selected from the group consisting of sulfate groups, sulfonate groups, polyoxyalkylene groups, anionically modified polyoxyalkylene groups, betaine groups, glucoside groups or amine oxide groups.

In an embodiment of the invention, the surfactant (B) is an anionic surfactant, in particular an anionic surfactant having sulfo groups without additional alkoxy groups. Examples of such surfactants comprise alkylbenzenesulfonates, olefinsulfonates, paraffinsulfonates, alkylcarboxylates, alkylsulfates and/or alkylphosphates.

In a further embodiment of the invention, the surfactant (B) is a surfactant selected from the group consisting of alkyl ether sulfonates, alkyl ether sulfates or alkyl ether carboxylates, the polyether group of the surfactant comprising in each case from 2 to 30 ether units. The ether units are preferably ethoxy and/or propoxy units. Alkyl ether sulfates which have predominantly propoxy units are very particularly preferred. Here, "predominantly" means that at least 50% of the ether units are propoxy units.

Further Surfactants

In addition to the surfactants (A) and (B), the formulation can moreover optionally also comprise surfactants (C) differing from (A) and (B).

Surfactants (C) may be in particular oligomeric or polymeric surfactants. With such polymeric cosurfactants, the amount of surfactant which is required for the formation of a microemulsion can advantageously be reduced. Such polymeric cosurfactants are therefore also referred to as "microemulsion boosters". Examples of such polymeric surfactants (C) comprise amphiphilic block copolymers which comprise at least one hydrophilic and at least one hydrophobic block. Examples comprise polypropylene oxide-polyethylene oxide block copolymers, polyisobutene-polyethylene oxide block copolymers and comb polymers having polyethylene oxide side chains and a hydrophobic main chain, the main chain preferably comprising substantially olefins or (meth)acrylates as structural units. The term "polyethylene oxide" is intended here in each case to include polyethylene oxide blocks according to the above definition which comprise propylene oxide units. Further details of such surfactants are disclosed in WO 2006/131541.

Preferred Combinations of Surfactants

The surfactants (A) and (B) and optionally (C) are selected by the person skilled in the art according to the conditions in the mineral oil formation to be treated.

A preferred combination here comprises surfactants (A) $R^1$—O—$(CH_2$—$CH_2$—$O)_x$—H, in which $R^1$ is a branched, aliphatic hydrocarbon radical having 8 to 32 carbon atoms and x is 11 to 40. Preferred numbers of carbon atoms and values for x have already been mentioned. Said surfactants (A) are combined with alkylbenzenesulfonates as surfactants (B) in the preferred combination.

A second preferred combination comprises branched aliphatic ethoxylates as surfactants (A) with organic sulfonates, preferably those selected from the groups consisting of olefinsulfonates, alkylbenzenesulfonates and alkyl ether sulfates, which comprise predominantly propoxy units. "Predominantly" means that at least 50% of the ether units are propoxy units.

Process for Mineral Oil Production

In the process according to the invention for mineral oil production, a suitable aqueous formulation of the surfactants (A) and (B) and optionally (C) is forced through at least one injection well into the mineral oil deposit and crude oil is removed from the deposit through at least one production well. A technique of this kind is also known as "surfactant flooding". In this context, the term "crude oil" does not of course mean single-phase oil but means the customary crude oil-water emulsions. As a rule, a deposit is provided with a plurality of injection wells and with a plurality of production wells. The principal effect of the surfactants here lies in the reduction of the interfacial tension between water and oil. This raises the mobility of the mineral oil in the deposit, and allows the production of mineral oil which, without the use of surfactants, would remain in the deposit. In this context, the interfacial tension between water and oil ought to be lowered to values of less than 0.1 mN/m, preferably less than 0.01 mN/m.

After the forcing in of the surfactant formulation, water ("water flooding") or preferably a more highly viscous, aqueous solution of a polymer having a pronounced thickening effect ("polymer flooding") can be injected into the formation for maintaining the pressure. However, other known techniques are those in which the surfactants are first allowed to act on the formation. A further known technique is the injection of the solution comprising surfactant and polymer having a thickening effect, followed by a solution of polymer having a thickening effect. Details of the technical procedure of "surfactant flooding", "water flooding" and "polymer flooding" are known to a person skilled in the art and he uses a corresponding technique according to the type of deposit.

In one preferred embodiment of the invention the process of the invention for mineral oil production constitutes Winsor type III microemulsion flooding, i.e. the injected surfactant mixture in the deposit, together with the water phase and the oil phase present in the deposit, forms a Winsor type III microemulsion. Details of Winsor III microemulsions and their advantages have already been outlined earlier on above. For Winsor type III microemulsion flooding, the interfacial tension between water and oil ought to be lowered to values of less than 0.1 mN/m, preferably less than 0.015 mN/m, and more preferably less than 0.01 mN/m.

For the process according to the invention, an aqueous formulation of the surfactants (A), (B) and optionally (C) is used. The formulations described below are particularly suitable for Winsor III microemulsion flooding, but can also be used for other techniques of surfactant flooding.

In addition to water, the formulations can optionally also comprise organic solvents miscible with water or at least dispersible in water. Such additions serve in particular for stabilizing the surfactant solution during the storage or the transport to the oil field. However, the amount of such additional solvents should as a rule not exceed 50% by weight, preferably 20% by weight and particularly preferably 10% by weight. In a particularly advantageous embodiment of the invention, exclusively water is used for formulation. Examples of solvents miscible with water comprise in particular alcohols, such as methanol, ethanol or propanol, and also $C_1$- to $C_6$-monoalkyl ethers of mono- or oligoglycols having up to 6 alkylene oxide units, such as butylethylene glycol, butyldiethylene glycol or butyltriethylene glycol.

The weight ratio of the surfactants (A) and (B) to one another is, according to the invention, from 10:1 to 1:20, preferably from 3:1 to 1:10 and very particularly preferably from 2:1 to 1:4.

According to the invention the proportion of the surfactants (A) and (B) together is at least 50% by weight, based on the proportion of all surfactants present, i.e. the surfactants (A), (B) and optionally (C) together. Preferably, the proportion is at least 75% by weight, particularly preferably at least 90% by weight, and very particularly preferably only the surfactants (A) and (B) are used as surfactants in the formulation.

In addition to the surfactants, the formulations may also comprise further components, such as, for example, $C_4$- to $C_8$-alcohols and also their alkoxylates having up to 6 alkylene oxide units, and/or basic salts (so-called "alkali surfactant flooding"). With such additions, for example the retention in the formation can be reduced. The ratio of the alcohols, based on the total amount of surfactants used, is as a rule at least 1:1—however, it is also possible to use a substantial excess of alcohols. The amount of basic salts may typically range from 0.1% by weight to 5% by weight.

By the choice of the surfactants (A) and (B) and the weight ratio thereof to one another, the person skilled in the art can influence the optimum temperature for the formation of a microemulsion $T_{opt}$ and can adapt it to the temperature of the deposit. The deposits in which the process is used have as a rule a temperature of at least 20° C., for example from 20 to 150° C., preferably a temperature of at least 30° C. and particularly preferably at least 50° C., for example from 50 to 120° C.

The total concentration of all surfactants together is from 0.05 to 5% by weight, based on the total amount of the aqueous surfactant formulation, preferably from 0.1 to 2.5% by weight. The person skilled in the art makes a suitable choice according to the desired properties, in particular according to the conditions in the mineral oil formation. It is clear here to a person skilled in the art that the concentration of the surfactants may change after injection into the formulation because the formulation can mix with formation water or surfactants can also be absorbed on solid surfaces of the formation. It is the major advantage of the mixtures used according to the invention that the formation of a microemulsion is not excessively influenced by such a change in the total concentration.

For a person skilled in the art of surfactant flooding it is clear that the deposit conditions as well, such as the deposit temperature, the pressure, the nature of the oil in the deposit, and the nature and amount of salts that are present, for example, influence the conditions for optimum formation of a Winsor III microemulsion. Taking into account the indications above, a person skilled in the art is able by means of simple routine tests to optimize the surfactant formulation for application in very specific mineral oil deposits.

It is of course possible and as a rule also advisable first to prepare a concentrate which is diluted only on site to the desired concentration for injection into the formation. As a rule, the total concentration of the surfactants in such a concentrate is from 15 to 60% by weight, in particular 15 to 45% by weight.

The following examples are intended to illustrate the invention in more detail:

Part I: Synthesis of the Surfactants (A) Used

General Method 1: Ethoxylation by Means of KOH Catalysis

In a 2 l autoclave, an aqueous KOH solution which comprises 50% by weight of KOH is added to the alcohol to be ethoxylated (1.0 eq). The amount of KOH is 0.3% by weight of the product to be prepared. The mixture is dewatered at 100° C. and 20 mbar for 2 hours with stirring. Thereafter, flushing is effected three times with $N_2$, an admission pressure of about 1.3 bar $N_2$ is established and the temperature is increased to 120-130° C. The ethylene oxide is metered in so that the temperature remains from 125° C. to 135° C. Thereafter, further stirring is effected for 5 h at 125-135° C., flushing with $N_2$ is effected, cooling to 70° C. is effected and the reactor is emptied. The basic crude product is neutralized with the aid of acetic acid. Alternatively, the neutralization can also be effected with commercially available magnesium silicates, which are then filtered off. The pale product is characterized with the aid of a 1H-NMR spectrum in $CDCl_3$, gel permeation chromatography and an OH number determination and the yield is determined.

General Method 2: Propoxylation by Means of KOH Catalysis

In a 2 l autoclave, an aqueous KOH solution which comprises 50% by weight of KOH is added to the alcohol to be propoxylated (1.0 eq). The amount of KOH is 0.3% by weight of the product to be prepared. The mixture is dewatered at 100° C. and 20 mbar for 2 hours with stirring. Thereafter, flushing is effected three times with $N_2$, an admission pressure of about 1.3 bar $N_2$ is established and the temperature is increased to 130-135° C. The propylene oxide is metered in so that the temperature remains from 130° C.-145° C. Thereafter, further stirring is effected for 5 h at 130-145° C., flushing with $N_2$ is effected, cooling to 70° C. is effected and the reactor is emptied. The basic crude product is neutralized with the aid of acetic acid. Alternatively, the neutralization can also be effected with commercially available magnesium silicates, which are then filtered off. The pale product is characterized with the aid of a 1H-NMR spectrum in $CDCl_3$, gel permeation chromatography and an OH number determination and the yield is determined.

General Method 3: Sulfation by Means of Chlorosulfonic Acid

In a 1 l round-necked flask, the alkyl alkoxylate to be sulfated (1.0 eq.) is dissolved in 1.5 times the amount of dichloromethane (based on % by weight) and cooled to 5 to 10° C. Thereafter, chlorosulfonic acid (1.1 eq.) is added dropwise so that the temperature does not exceed 10° C. The mixture is allowed to warm up to room temperature and is stirred for 4 h at this temperature under an $N_2$ stream before the above reaction mixture is added dropwise to an aqueous NaOH solution with half the volume at not more than 15° C. The amount of NaOH is calculated so that there is a slight excess relative to the chlorosulfonic acid used. The resulting pH is about pH 9 to 10. The dichloromethane is removed under slightly reduced pressure on a rotary evaporator at no more than 50° C.

The product is characterized by 1H-NMR and the water content of the solution is determined (about 70%).

The following alcohols were used for the synthesis.

| Alcohol | Description |
| --- | --- |
| iC17 | iso-$C_{17}H_{35}$—OH; oxo alcohol, prepared by hydroformylation of isohexadecene which is obtained by tetramerization of butene. The average degree of branching of the alcohol is 3.1. |
| iC13 | iso-$C_{13}H_{27}$—OH; oxo alcohol, prepared by hydroformylation of isododecene which is obtained by trimerization of butene. The average degree of branching of the alcohol is 2.2. |
| C16C18 | Commercially available fatty alcohol mixture consisting of linear $C_{16}H_{33}$—OH and $C_{18}H_{37}$—OH |
| 2-PH | 2-Propylheptanol |

The alcohols were ethoxylated in each case according to method 1. The respective degree of ethoxylation is summarized in tables 1 to 4.

The polydispersity of the alkoxylated products was determined in each case by means of gel permeation chromatography (GPC).

The unit used was an Agilent 1200 series with pump, degasser, RI detector, autosampler and column thermostat, PSS 6.03 was used as software. The following columns were used:

| |
| --- |
| precolumn SDV 5μ - 8 × 50 mm |
| SDV 5μ 100 Å |
| SDV 5μ 1000 Å |
| SDV 5μ 100 000 Å |

Calibration substances were DIN polystyrene from PSS. Toluene served as a standard. The eluent was tetrahydrofuran for chromatography. The flow rate was 1 ml/min. About 25 mg of the sample are dissolved in 1 ml of solvent (250 ml of THF—1.5 g of toluene), the toluene being mixed beforehand with the THF in order to obtain reproducible results.

The determined polydispersity in the case of the alkyl ethoxylates used is between 1.08 and 1.16.

Testing of Performance Characteristics

The following tests were carried out with the surfactants obtained, in order to rate their properties for tertiary mineral oil production.

Description of the Methods of Measurement

Determination of SP* a) Principle of the Measurement:

The interfacial tension between water and oil was determined in a known manner via the measurement of the solubilization parameter SP*. The determination of the interfacial tension by the determination of the solubilization parameter SP* is a method accepted among those skilled in the art for the approximate determination of the interfacial tension. The solubilization parameter SP* indicates how many ml of oil is dissolved per ml of surfactant used in a microemulsion (Winsor type III). The interfacial tension σ (IFT) can be calculated therefrom via the approximation formula IFT≈0.3/(SP*)² if equal volumes of water and oil are used (C. Huh, J. Coll. Interf. Sc., vol. 71, no. 2 (1979)).

b) Working Method

For determining the SP*, a 100 ml measuring cylinder with magnetic stirring rod is filled with 20 ml of oil and 20 ml of water. 10, 5, 2.5, 1.2 or 0.6 percent by weight of surfactant, based on the water phase, are added thereto. Thereafter, the temperature is increased stepwise from 20 to 90° C., and the temperature range within which a microemulsion formed is observed.

The formation of the microemulsion can be observed visually or with the aid of conductivity measurements. A three-phase system (upper phase oil, middle phase microemulsion, lower phase water) forms. If upper and lower phase are of the same magnitude and moreover nothing changes over a period of 12 h, the optimum temperature ($T_{opt}$) of the microemulsion has been found. The volume of the middle phase is determined. The volume of added surfactant is subtracted from this volume. The value obtained is then divided by two. This volume is now divided by the volume of added surfactant. The result is noted as SP*.

The type of oil and water used for determining SP* is determined according to the system to be investigated. Firstly, mineral oil itself can be used, or a model oil, such as, for example, decane or hexadecane. Both pure water and saline water can be used as water in order better to model the conditions in the mineral oil formation. The composition of the aqueous phase can be adjusted, for example, according to the composition of a certain reservoir water.

Information on the aqueous phase used and the oil phase is to be found below in the specific description of the experiments.

Test Results:

A 1:1 mixture of decane and a water having a high salt content was used (salt content in percent by weight: 13.2% of NaCl, 4.26% of $CaCl_2$, 1.05% of $MgCl_2$, 0.03% of $Na_2SO_4$).

A surfactant mixture comprising the alkyl ethoxylate used in each case and the dodecylbenzenesulfonate was added thereto. The total surfactant concentration varied from 10.0 percent by weight to 0.6 percent by weight of the water phase. The results are listed in tables 1, 2 and 3. Here, ΔT is in each case the difference between the largest and the smallest $T_{opt}$ of each experimental series.

In the case of surfactants based on 2-propylheptanol, a 1:1 mixture of decane and a water having a salt content of 7% NaCl was used.

A surfactant mixture comprising the 2-PH-ethoxylates used in each case and a combination of C16C18-7PO-sulfate:dodecylbenzenesulfonate=3:1 was added thereto. The total surfactant concentration varied from 4.48 percent by weight to 0.56 percent by weight of the water phase. The results are listed in table 4. Here, $\Delta T_{opt}$ is in each case the difference between the largest and the smallest $T_{opt}$ of each experimental series.

TABLE 1

List of the results with surfactants based on $iC_{17}$-alcohol

| Example no. | Surfactant (A) | Surfactant (B) | Weight ratio (A)/(B) | Total concentration [%] | $T_{opt}$ [°C.] | SP* | IFT [mN/m] at $T_{opt}$ | $\Delta T_{opt}$ [°C.] |
|---|---|---|---|---|---|---|---|---|
| Example 1 | iC17-18EO—H | $C_{12}H_{25}PhSO_3Na$ | 2:1 | 10.0 | 70 | 1.5 | 0.133 | 8 |
|  |  |  |  | 5 | 68 | 1.8 | 0.0925 |  |
|  |  |  |  | 2.5 | 66 | 2.0 | 0.075 |  |
|  |  |  |  | 1.2 | 74 | 2.6 | 0.0444 |  |
|  |  |  |  | 0.6 | 74 | <2 | >0.075 |  |
| Example 2 | iC17-15EO—H | $C_{12}H_{25}PhSO_3Na$ | 2:1 | 10.0 | 69 | 2 | 0.075 | 3 |
|  |  |  |  | 5 | 68 | 1.9 | 0.083 |  |
|  |  |  |  | 2.5 | 69 | 2.5 | 0.048 |  |
|  |  |  |  | 1.2 | 71 | 2.6 | 0.044 |  |
|  |  |  |  | 0.6 | 71 | 1.6 | 0.117 |  |
| Example 3 | iC17-14.0EO—H | $C_{12}H_{25}PhSO_3Na$ | 2:1 | 10.0 | 57 | 4.4 | 0.0155 | 8 |
|  |  |  |  | 5 | 60 | 3.5 | 0.0244 |  |
|  |  |  |  | 2.5 | 62 | 3 | 0.0333 |  |
|  |  |  |  | 1.2 | 65 | 2.6 | 0.0444 |  |
|  |  |  |  | 0.6 | 65 | 2.6 | 0.0444 |  |
| C1 | iC17-10EO—H | $C_{12}H_{25}PhSO_3Na$ | 2:1 | 10.0 | 35 | >10 | <0.003 | 17 |
|  |  |  |  | 5 | 40 | 9.5 | 0.0033 |  |
|  |  |  |  | 2.5 | 42 | 9 | 0.0037 |  |
|  |  |  |  | 1.2 | 48 | 7.8 | 0.0049 |  |
|  |  |  |  | 0.6 | 52 | 4.7 | 0.0136 |  |
| C2 | iC17-8EO—H | $C_{12}H_{25}PhSO_3Na$ | 4:1 | 10.0 | 10 | >9.5 | <0.0033 | 26 |
|  |  |  |  | 2.5 | 26 | 30 | 0.00033 |  |
|  |  |  |  | 0.6 | 36 | 8 | 0.00469 |  |

TABLE 2

List of the results with surfactants based on $iC_{13}$-alcohol

| Example no. | Surfactant (A) | Surfactant (B) | Ratio (A)/(B) | Total concentration [%] | $T_{opt}$ [°C.] | SP* | IFT [mN/m] at $T_{opt}$ | $\Delta T_{opt}$ [°C.] |
|---|---|---|---|---|---|---|---|---|
| Example 4 | iC13-18EO—H | $C_{12}H_{25}PhSO_3Na$ | 2:1 | 10.0 | 80 | 0.5 | 1.2 | 3 |
|  |  |  |  | 5 | 81 | 1.25 | 0.192 |  |
|  |  |  |  | 2.5 | 82 | 0.5 | 1.2 |  |
|  |  |  |  | 1.2 | 82 | 0.5 | 1.2 |  |
|  |  |  |  | 0.6 | 83 | 0.5 | 1.2 |  |
| Example 5 | iC13-15EO—H | $C_{12}H_{25}PhSO_3Na$ | 2:1 | 10.0 | 67 | 1.5 | 0.133 | 7 |
|  |  |  |  | 5 | 69 | 1 | 0.30 |  |
|  |  |  |  | 2.5 | 71 | 3 | 0.033 |  |
|  |  |  |  | 1.2 | 73 | 1.1 | 0.248 |  |
|  |  |  |  | 0.6 | 74 | 0.5 | 1.2 |  |
| Example 6 | iC13-12.8EO—H | $C_{12}H_{25}PhSO_3Na$ | 2:1 | 10.0 | 65 | 1.75 | 0.098 | 10 |
|  |  |  |  | 5 | 65 | 1.5 | 0.133 |  |
|  |  |  |  | 2.5 | 68 | 2.5 | 0.048 |  |
|  |  |  |  | 1.2 | 74 | 0.5 | 1.2 |  |
|  |  |  |  | 0.6 | 75 | 0.5 | 1.2 |  |
| C3 | iC13-10EO—H | $C_{12}H_{25}PhSO_3Na$ | 2:1 | 10.0 | 52 | 2.9 | 0.0357 | 18 |
|  |  |  |  | 5 | 57 | 2 | 0.075 |  |
|  |  |  |  | 2.5 | 57 | 2.5 | 0.048 |  |
|  |  |  |  | 1.2 | 65 | 1.6 | 0.117 |  |
|  |  |  |  | 0.6 | 70 | 0.5 | 1.2 |  |

TABLE 3

List of the results with surfactants based on $C_{16/18}$-alcohols

| Example no. | Surfactant (A) | Surfactant (B) | Ratio (A)/(B) | Total concentration [%] | $T_{opt}$ [°C.] | SP* | IFT [mN/m] at $T_{opt}$ | $\Delta T_{opt}$ [°C.] |
|---|---|---|---|---|---|---|---|---|
| Example 7 | C16C18-18EO—H | $C_{12}H_{25}PhSO_3Na$ | 2:1 | 5 | 83 | 1.5 | 0.133 | 1 |
|  |  |  |  | 2.5 | 83 | 1.5 | 0.133 |  |
|  |  |  |  | 1.2 | 84 | 1.6 | 0.117 |  |
|  |  |  |  | 0.6 | 84 | 1.6 | 0.117 |  |

TABLE 3-continued

List of the results with surfactants based on $C_{16/18}$-alcohols

| Example no. | Surfactant (A) | Surfactant (B) | Ratio (A)/(B) | Total concentration [%] | $T_{opt}$ [°C.] | SP* | IFT [mN/m] at $T_{opt}$ | $\Delta T_{opt}$ [°C.] |
|---|---|---|---|---|---|---|---|---|
| Example 8 | C16C18-13EO—H | $C_{12}H_{25}PhSO_3Na$ | 2:1 | 5 | 72 | 2.5 | 0.048 | 2 |
| | | | | 2.5 | 72 | 2.75 | 0.039 | |
| | | | | 1.2 | 72 | 2.63 | 0.043 | |
| | | | | 0.6 | 74 | 2.6 | 0.044 | |
| C4 | C16C18-10EO—H | $C_{12}H_{25}PhSO_3Na$ | 2:1 | 10.0 | 48 | 8.5 | 0.0042 | 13 |
| | | | | 5 | 53 | 7 | 0.0061 | |
| | | | | 2.5 | 55 | 6.5 | 0.0071 | |
| | | | | 1.2 | 58 | 4.7 | 0.136 | |
| | | | | 0.6 | 61 | 3.7 | 0.019 | |
| C5 | C16C18-8.4EO—H | $C_{12}H_{25}PhSO_3Na$ | 2:1 | 10.0 | 30 | >9.5 | <0.00332 | 5 |
| | | | | 2.5 | 29 | 17.5 | 0.00098 | |
| | | | | 0.6 | 35 | 9.9 | 0.00306 | |
| C6 | C16C18-8.4EO—H | $C_{12}H_{25}PhSO_3Na$ | 8:1 | 10.0 | 38 | >9.5 | <0.00333 | 17 |
| | | | | 2.5 | 47 | 6 | 0.00833 | |
| | | | | 0.6 | 55 | 4.7 | 0.01358 | |

TABLE 4

List of the results with surfactants based on 2-propylheptanol in the system comprising 7% NaCl and decane

| Example no. | Surfactant (A) | Surfactant mixture (B) | Ratio (A)/(B) | Total concentration [%] | $T_{opt}$ [°C.] | SP* | IFT [mN/m] at $T_{opt}$ | $\Delta T$ [°C.] |
|---|---|---|---|---|---|---|---|---|
| Example 9 | 2-PH-14EO—H | C16C18—7PO-sulfate:$C_{12}H_{25}PhSO_3Na$ (3:1) | 1:2.5 | 4.48 | 64 | 11 | 0.00248 | 2° C. |
| | | | | 2.24 | 65 | 11 | 0.00248 | |
| | | | | 1.12 | 65 | 12 | 0.00208 | |
| | | | | 0.56 | 63 | 12 | 0.00208 | |
| C7 | 2-PH-6EO—H | C16C18—7PO-sulfate:$C_{12}H_{25}PhSO_3Na$ (3:1) | 1:1.43 | 5.44 | 42 | 9.3 | 0.00347 | 7° C. |
| | | | | 0.68 | 49 | 10 | 0.00300 | |

The examples and comparative examples show that $\Delta T_{opt}$ increases with a decreasing number of ethoxy units in the surfactant (A).

In the case of branched alcohols having 10 or less ethoxy units, $\Delta T_{opt}$ is generally above 10° C. (26° C. in the case of comparative example 2; 18° C. in the case of comparative example 3). $T_{opt}$ increases here in each case very particularly substantially at low surfactant concentrations. In examples 1 to 6 and in example 9, it is clearly evident that $\Delta T_{opt}$ remains at not more than 10° C. This is of major importance for surfactant floodings of the deposit. Owing to the possible dilutions of the surfactant solution in the formation (for example by an underground aquifer, mixing with reservoir water), the surfactant concentration decreases. As a result, the optimum temperature of the surfactant solution would differ greatly from the temperature of the deposit, which would lead to an increase in the interfacial tension (departure from the microemulsion range of Winsor type III).

In the case of linear alcohols having 10 or less ethoxy units, the situation is similar if the surfactant mixture is adjusted so that microemulsions are to be formed at temperatures of >40° C. In comparative example 4. $\Delta T_{opt}$ is 13° C. It is true that comparative example 5 has a $\Delta T_{opt}$ of only 5° C. However, a temperature of only 30° C. occurs only rarely in real mineral oil formations. If the surfactant mixture is adjusted so that the microemulsion is formed only at temperatures of >40° C., then $\Delta T_{opt}$ is 17° C.

In Example 9, a different surfactant mixture was chosen in order to show that, on further optimization of surfactant (B), low interfacial tensions of ≤0.003 mN/m and a virtually constant $T_{opt}$ can be achieved independently of the total surfactant concentration used, provided that a polydisperse alkyl ethoxylate having a minimum degree of ethoxylation of 11 ethylene oxide units is present. Comparative example C 7 shows that $T_{opt}$ is substantially greater if the degree of ethoxylation comprises less than 10 EO units.

In a further series of experiments, the following investigations were carried out with the crude oil from the deposits in southern Germany:

The crude oil has an API of 33°.

The deposit temperature is around 55° C.

The reservoir water has a salt content of 3570 ppm TDS (total dissolved salt)

Added to an NaCl solution were 1% of $Na_2CO_3$, a surfactant mixture of 3 parts of $C_{16}C_{18}$-7PO-0.1EP sulfate and 1 part of dodecylbenzenesulfonate and also a variable amount of sec-butanol (s-BuOH) or $C_{16}C_{18}$-10 EO (prepared by KOH catalysis; D=1.11) or $C_{16}C_{18}$-13 EO prepared by DMC catalysis, D=1.05). The total surfactant concentration and the amount of $Na_2CO_3$ in percent by weight in the aqueous phase are reported. The solubility of the surfactant mixture is determined at different temperatures. The behavior of the binary system (saline water and surfactants) is specified in the table below at the temperatures at which microemulsion formation is observed in the presence of crude oil.

Next, the ternary system is investigated, by preparation of a 1:1 mixture of crude oil and the above saline surfactant solution. Optimum temperature $T_{opt}$ of the formation of microemulsions in accordance with Winsor type III is recorded.

Finally, interfacial tensions of crude oil in the presence of surfactant solutions are determined at 50° C. by the spinning drop method on an SVT20 from DataPhysics. For this purpose, a drop of oil is injected into a capillary filled with saline surfactant solution, at 50° C. and the expansion of the drop is observed at approximately 4500 revolutions per minute until a constant value is established. This is typically the case after 2 hours. The interfacial tension IFT (or $\sigma_{II}$) is calculated—as described by Hans-Dieter Dörfler in "Grenzflächen and kolloid-disperse Systeme", Springer Verlag Berlin Heidelberg 2002—in accordance with the following formula, from the cylinder diameter $d_2$, the rotational speed and the density difference ($d_1-d_2$):

$$\sigma_{II} = 0.25\, d_z^3\, \omega 2\, (d_1-d_2).$$

The results are compiled in Table 5.

that it allowed the amount of chemicals to be reduced significantly as compared with the formulations based on sec-butanol. It is found, however, that there is still a marked dependency of the optimum temperature on the amount of surfactant formulation employed. The increase, though now only 12° C., is nevertheless still significant.

In the case of the claimed surfactant mixtures comprising alkyl ethoxylates having 11 and more EO units, an improved temperature stability is apparent. The increase in the degree of ethoxylation has raised the overall hydrophilicity of the surfactant mixture. For a given salt content, the values for Topt were higher overall. In examples 10 and 11, however, it can seen that Topt alters only slightly, despite the use of very different concentrations. In order to maintain the optimum temperature in the region of the deposit temperature, the

TABLE 5

| Example | Surfactant formulation | $Na_2CO_3$ | NaCl | $T_{opt}$ | Solubility in the binary system at $T_{opt}$ |
|---|---|---|---|---|---|
| C8 | 3% $C_{16}C_{18}$—7PO—0.1EO sulfate, 1% dodecylbenzenesulfonate, 8% s-BuOH | 1% | 2.5% | 35° C. | clear |
| C9 | 1.5% $C_{16}C_{18}$—7PO—0.1EO sulfate, 0.5% dodecylbenzenesulfonate, 4% s-BuOH | 1% | 2.5% | 56° C. | clear |
| C10 | 0.75% $C_{16}C_{18}$—7PO—0.1EO sulfate, 0.25% dodecylbenzenesulfonate, 2% s-BuOH | 1% | 2.5% | 62° C. | clear |
| C11 | 3% $C_{16}C_{18}$—7PO—0.1EO sulfate, 1% dodecylbenzenesulfonate, 2% $C_{16}C_{18}$—10EO (KOH, D = 1.11) | 1% | 3% | 53° C. | clear |
| C12 | 1.5% $C_{16}C_{18}$—7PO—0.1EO sulfate, 0.5% dodecylbenzenesulfonate, 1% $C_{16}C_{18}$—10EO (KOH, D = 1.11) | 1% | 3% | 63° C. | clear |
| C13 | 0.75% $C_{16}C_{18}$—7PO—0.1EO sulfate, 0.25% dodecylbenzenesulfonate, 0.5% $C_{16}C_{18}$—10EO (KOH, D = 1.11) | 1% | 3% | 65° C. | clear |
| 8 | 3% $C_{16}C_{18}$—7PO—0.1EO sulfate, 1% dodecylbenzenesulfonate, 2% $C_{16}C_{18}$—13EO (DMC, D = 1.05) | 1% | 3% | 80° C. | clear |
| 9 | 1.5% $C_{16}C_{18}$—7PO—0.1EO sulfate, 0.5% dodecylbenzenesulfonate, 1% $C_{16}C_{18}$—13EO (DMC, D = 1.05) | 1% | 3% | 78° C. | clear |
| 10 | 0.75% $C_{16}C_{18}$—7PO—0.1EO sulfate, 0.25% dodecylbenzenesulfonate, 0.5% $C_{16}C_{18}$—13EO (DMC, D = 1.05) | 1% | 4% | 54° C. | clear |

For the formation of Winsor type III microemulsions within 1 to 2 hours' separation time, relatively high amounts of sec-butanol were required, as in comparative examples C8, C9 and C10. This severely detracts from the economics of the process. Moreover, the system is highly sensitive to reduction in the total amount of formulation. the optimum temperature climbs from 35° C. to 62° C. This is extremely unfavorable against the background of concentration fluctuations in the flooding process as a result of adsorption or retention.

As can be seen in comparative examples C11, C12 and C13, the use of alkyl ethoxylates has the significant advantage amount of NaCl was increased accordingly. As can be seen in example 12, the optimum temperature can be adjusted to 54° C. using 4% NaCl.

Interfacial tension measurements at 55° C. produced very low values, which are ideal for the mobilization of mineral oil in deposits. Significantly lower concentrations were used than in the case of the phase investigations, in order to demonstrate the potential and the economics. The results are compiled in Table 6.

TABLE 6

| Example | Surfactant formulation | $Na_2CO_3$ | NaCl | IFT | Solubility in the binary system at 50° C. |
|---|---|---|---|---|---|
| 13 | 0.15% $C_{16}C_{18}$—7PO—0.1EO sulfate, 0.05% dodecylbenzenesulfonate, 0.1% $C_{16}C_{18}$—13EO (KOH, D = 1.05) | 1% | 4% | 0.0038 mN/m | clear |
| 14 | 0.0375% $C_{16}C_{18}$—7PO—0.1EO sulfate, 0.0125% dodecylbenzenesulfonate, 0.025% $C_{16}C_{18}$—13EO (KOH, D = 1.05) | 1% | 4% | 0.0047 mN/m | clear |

In the case of Example 13 the surfactant system was so efficient that the oil drop injected was dissolved within the first second by the amount of surfactant present. This is usually an indication of very low interfacial tensions, of below 0.001 mN/m.

Only when the surfactant concentration was reduced further, as in the case of Example 14, was it possible to determine an interfacial tension exactly. It had a pleasingly low value of 0.006 mN/m.

The invention claimed is:

1. A process for mineral oil production in which an aqueous surfactant formulation comprising at least one nonionic surfactant and at least one further surfactant is forced through at least one injection well into a mineral oil deposit and crude oil is removed from the deposit through at least one production well, wherein the surfactant formulation at least comprises
   (A) at least one surfactant (A) of the general formula $R^1$—O—$(CH_2$—$CH_2$—$O)_x$—H, in which $R^1$ is a straight-chain or branched aliphatic and/or aromatic hydrocarbon radical having 8 to 32 carbon atoms and x is a number from 11 to 40, and
   (B) at least one surfactant (B) differing therefrom and of the general formula $R^2$—Y, in which $R^2$ is a straight-chain or branched aliphatic and/or aromatic hydrocarbon radical having 8 to 32 carbon atoms and Y is a hydrophilic group,
the weight ratio (A)/(B) being from 10:1 to 1:20, and the proportion of the surfactants (A) and (B) together being at least 50% by weight, based on the amount of all surfactants in the surfactant mixture used;
wherein the polydispersity of the surfactants (A) is from 1.04 to 1.2.

2. The process according to claim 1, wherein the preparation of the surfactants (A) is carried out by ethoxylation of alcohols $R^1$—OH with basic catalysis.

3. The process according to claim 2, wherein the polydispersity of the surfactants (A) is from 1.04 to 1.2.

4. The process according to claim 2, wherein $R^1$ is a linear, aliphatic hydrocarbon radical and x is a number from 11 to 30.

5. The process according to claim 2, wherein $R^1$ is a branched, aliphatic hydrocarbon radical and x is a number from 12 to 30.

6. The process according to claim 1, wherein $R^1$ is a linear, aliphatic hydrocarbon radical and x is a number from 11 to 30.

7. The process according to claim 6, wherein x is a number from 12 to 20.

8. The process according to claim 1, wherein $R^1$ is a branched, aliphatic hydrocarbon radical and x is a number from 12 to 30.

9. The process according to claim 8, wherein x is a number from 12 to 20.

10. The process according to claim 1, wherein the surfactant (B) is an anionic surfactant.

11. The process according to claim 1, wherein the group Y of the surfactant (B) is a group selected from the group consisting of sulfate groups, sulfonate groups, polyoxyalkylene groups, anionically modified polyoxyalkylene groups, betaine groups, glucoside groups or amine oxide groups.

12. The process according to claim 1, wherein the surfactant (B) is a surfactant selected from the group consisting of alkyl ether sulfonates, alkyl ether sulfates or alkyl ether carboxylates, the polyether group of the surfactant comprising in each case from 2 to 30 ether units.

13. The process according to claim 1, wherein the concentration of all surfactants together is from 0.05 to 5% by weight, based on the total amount of the aqueous surfactant formulation.

14. The process according to claim 1, wherein the process is Winsor type III microemulsion flooding, wherein the injected surfactant mixture in the deposit, together with the water phase and the oil phase present in the deposit forms a Winsor type III microemulsion, the interfacial tension between water and oil being less than 0.1 mM/m.

15. The process according to claim 14, wherein the interfacial tension is less than 0.01 mN/m.

* * * * *